United States Patent [19]
Jones et al.

[11] Patent Number: 5,273,393
[45] Date of Patent: Dec. 28, 1993

[54] GAS TURBINE ENGINE CASING

[75] Inventors: Emlyn Jones; Derek Hodgson, both of Derby, England

[73] Assignee: Rolls-Royce plc, London, England

[21] Appl. No.: 12,459

[22] Filed: Feb. 2, 1993

[30] Foreign Application Priority Data

Mar. 26, 1992 [GB] United Kingdom ............... 9206542

[51] Int. Cl.$^5$ ............................................. F04D 29/40
[52] U.S. Cl. ....................................................... 415/9
[58] Field of Search ............................................ 415/9

[56] References Cited

U.S. PATENT DOCUMENTS

| | | | |
|---|---|---|---|
| 4,149,824 | 4/1979 | Adamson | 415/9 |
| 4,425,080 | 1/1984 | Stanton et al. | 415/9 |
| 4,474,346 | 10/1984 | Murphy et al. | 415/9 |
| 4,934,899 | 6/1990 | Patacca | 415/9 |

FOREIGN PATENT DOCUMENTS

| | | |
|---|---|---|
| 2292112 | 7/1976 | France ............................ 415/9 |
| 1453873 | 10/1976 | United Kingdom . |
| 2159886 | 12/1985 | United Kingdom . |
| 2219633 | 12/1989 | United Kingdom . |

Primary Examiner—John T. Kwon
Attorney, Agent, or Firm—Cushman, Darby & Cushman

[57] ABSTRACT

A gas turbine engine is mounted from a pylon. The gas turbine engine has an annular fan casing which is provided with a composite containment ring. A plate is attached to the underside of the pylon, the ends of which extend radially inwards towards the fan casing. The plate acts to direct the containment ring, as it distorts under the impact of a blade, away from the pylon. The plate reduces the amount of interaction between the containment ring and the pylon so minimising any damage to the pylon and the associated aircraft structure.

5 Claims, 2 Drawing Sheets ically 5,273,393

GAS TURBINE ENGINE CASING

FIELD OF THE INVENTION

The present invention relates to a a gas turbine engine casing and more particularly to a containment assembly for use with such a casing.

BACKGROUND OF THE INVENTION

DESCRIPTION OF THE PRIOR ART

It is necessary to provide a containment assembly for a gas turbine engine so that in the event of a rotating part of the engine becoming detached it will be prevented from passing through the engine casing. Containment of a rotating part, such as a fan blade, which has become detached reduces the possibility of damage to the remainder of the engine or the aircraft structure to which the engine is attached.

A conventional containment assembly consists of an annulus which is placed around the engine casing. Containment rings have in the past been manufactured from metal. Metal containment rings are manufactured from relatively thick sections of metal to ensure that they have adequate strength. This results in a heavy structure which is particularly undesirable in the case of an aircraft gas turbine engine.

Composite containment rings are obviously much lighter than metal ones, however the composite ring distorts as it absorbs the energy of the failed component. The distortion travels around the composite containment ring dissipating the energy of the component.

As gas turbine engines increase in diameter, to provide more thrust, the distance between the engine support structure, such as a pylon attached to the aircraft fuselage, and the engine casing decreases. In some instances the engine is mounted so closely to the pylon that the distance between the engine casing and the pylon is less than the maximum excursion of the composite containment ring when a failed component impacts the ring. The composite containment ring interacts with the pylon and associated aircraft structure and can cause damage to either or both.

SUMMARY OF THE INVENTION

The present invention seeks to provide a containment assembly in which the amount of interaction with the pylon and associated aircraft fuselage is substantially minimised.

According to the present invention a containment assembly comprises a gas turbine engine attached to an aircraft structure, the gas turbine engine having an annular casing around which a plurality of fibrous layers are wrapped, a reinforcing member being supported radially outward of the fibrous layers, the reinforcing member being spaced apart from the fibrous layers and is adjacent to the aircraft structure so that in operation in the event of a rotating part of the gas turbine engine becoming detached the rotating part is contained within the annular casing by the fibrous layers, the fibrous layers distorting to absorb the energy of the rotating part, the distortion travelling through the fibrous layers around the annular engine casing, the reinforcing member acting to deflect the distorted fibrous layers away from the aircraft structure so that the amount of interaction between the distorted fibrous layers and the aircraft structure is minimised.

Preferably the reinforcing member is attached to the underside of a pylon from which the engine is mounted.

The reinforcing member is a metal plate preferably manufactured from titanium. The ends of the plate are bent radially inward towards the engine casing to aid deflection of the deflected fibrous layers away from the aircraft structure. Preferably the plate is provided with rounded corners which prevent the distorted fibrous layers being damaged as they are deflected away from the aircraft structure by the plate.

In the preferred embodiment of the present invention the fibrous layers are manufactured from aramid fibres.

BRIEF DESCRIPTION OF THE DRAWINGS

The present invention will now be described with reference to the accompanying drawings in which.

DETAILED DESCRIPTION OF THE INVENTION

Figure 1:
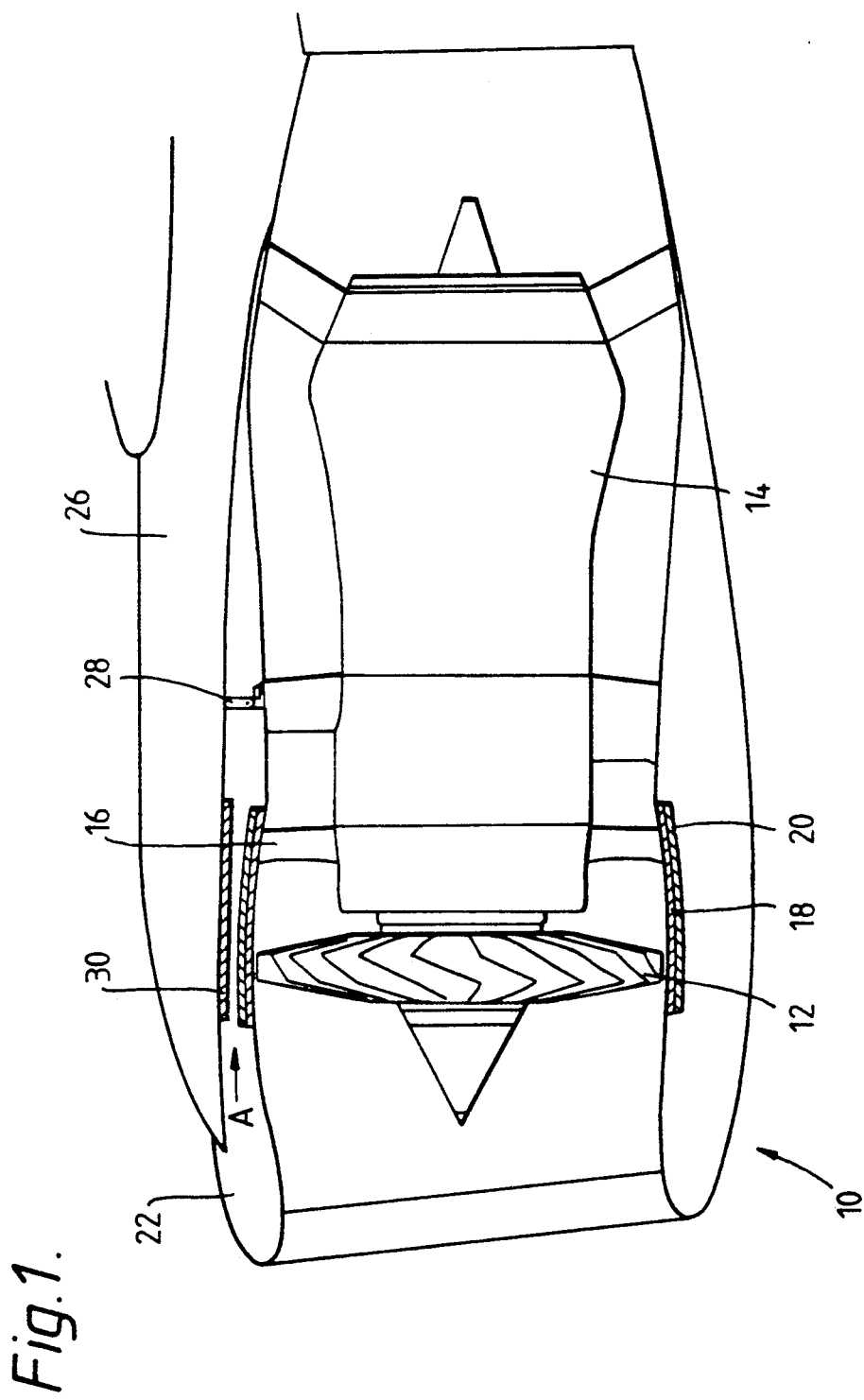
FIG. 1 is a partially cross-sectional view of a gas turbine engine having a containment assembly in accordance with the present invention.

Referring to FIG. 1 a gas turbine engine generally indicated at 10 comprises a fan 12 and a core gas generator 14. Provided radially outwardly of the fan 12 is an annular fan casing 18 which is connected to the remainder of the engine by radially extending struts 16.

A containment ring 20 is located around the fan casing 18. The containment ring 20 comprises a plurality of fibrous layers which are wrapped around the fan casing 18. The fibrous layers are woven from aramid fibres. The material which appears most suitable for this purpose is made by Du Pont Ltd and is sold under the trade name of Kevlar.

Figure 2:
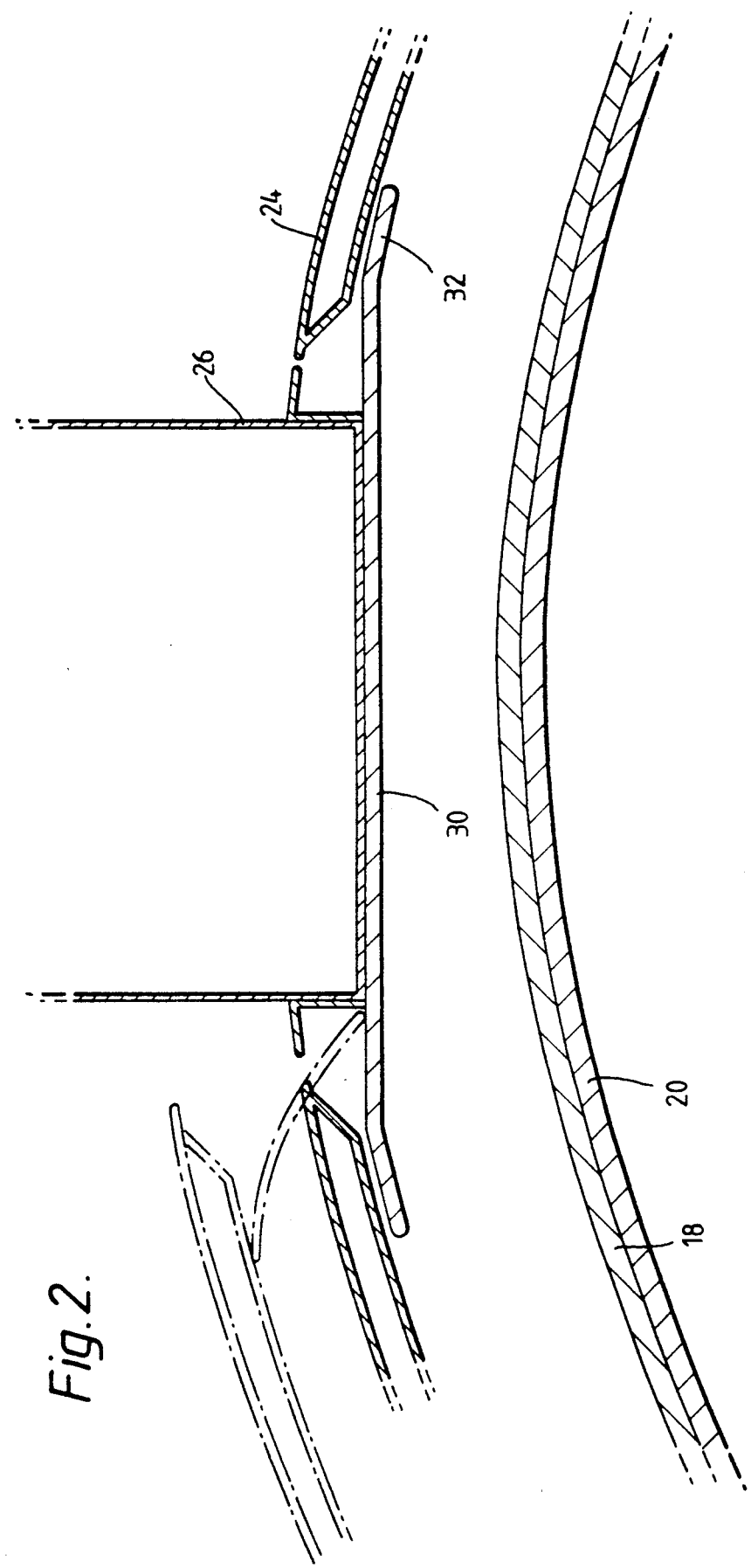
FIG. 2 is an enlarged cross-sectional view of part of the containment assembly shown in FIG. 1 when viewed in the direction of arrow A.

The engine 10 is enclosed in a streamlined nacelle 22 in known manner. The fan casing 18 and the containment ring 20 are embedded in the nacelle 22. To allow for easy access to the engine 10 doors 24, shown in FIG. 2, are provided in the nacelle 22 adjacent the fan casing 18.

The engine 10 is suspended from a pylon 26, which is attached to the fuselage of an aircraft (not shown), by engine mounts 28. The pylon 26 extends through the nacelle 22 and reinforcing member 30, shown as a plate, is attached to the underside of the pylon 26 adjacent the doors 24 in the nacelle 22. In the preferred embodiment of the present invention the plate 30 is metal and is made from titanium. The ends 32 of the plate 30 are curved radially inward towards the containment ring 20 and the corners are rounded (FIG. 2).

If a rotating component, such as a fan blade, becomes detached during operation of the engine 10 it is flung radially outward towards the fan casing 18. The fan blade is contained within the fan casing 18 by the Kevlar layers 20. Containment of the detached blade reduces the possibility of damage to the remainder of the engine 10 or the aircraft fuselage.

The detached fan blade impacts the Kevlar layers 20 which distort. The distortion is transmitted through the kevlar 20 and travels around the annular fan casing 18 dissipating the energy of the detached blade. As the distortion in the Kevlar layers 20 approaches the pylon 26 it impacts the plate 30. The ends 32 of the plate 30 which are curved radially inward deflect radially outward, to the dotted position shown in FIG. 2, under the force of the impact of the distorted Kevlar layers 20. Deflection of the plate 30 under the force of the impact of the distorted Kevlar layers 20 causes the doors 24 in the nacelle 22 to also move radially outward to the dotted position in FIG. 2.

Movement of the doors 24, radially outward, prevents damage being caused to the nacelle 22 as the plate 30 deflects to absorb some of the energy in the Kevlar layers 20. The plate 30 absorbs some of the energy in the Kevlar layers 20 and directs the distorted Kevlar layers 20 under the plate 30 away from the pylon 26. The corners of the plate 30 are rounded so that the Kevlar layers 20 are not damaged as it is directed under the plate 30. The plate 30 by directing the distorted Kevlar layers 20 under the pylon 26 minimises any interaction of the Kevlar layers 20 with the pylon 26. Damage caused to the pylon 26 as a result of the distorted Kevlar layers 20 interacting with it is thus substantially reduced.

The plate 30 also serves to reinforce the underside of the pylon 26 should a blade impact the fan casing 18 directly below the pylon 26.

It will be appreciated that the present invention is applicable to gas turbine engines mounted from any part of an aircraft fuselage where space between the casing and the fuselage is restricted.

We claim:

1. A containment assembly comprising a gas turbine engine attached to an aircraft structure, said gas turbine engine having a longitudinal axis and an annular casing around which a plurality of fibrous layers are wrapped, a reinforcing plate being supported radially outward of the fibrous layers, the reinforcing plate being spaced apart from the fibrous layers and being rigidly attached to the aircraft structure, the reinforcing plate having sides which extend parallel to the longitudinal axis of the engine, the axially extending sides of the reinforcing plate being inclined radially inwardly towards the engine casing so that in operation, in the event of a rotating part of the gas turbine engine becoming detached, the rotating part will be contained within the annular casing by the fibrous layers with the fibrous layers distorting to absorb the energy of the rotating part, the distortion travelling through the fibrous layers around the annular engine casing, the axially extending sides of the reinforcing plate acting to deflect the distorted fibrous layers away from the aircraft structure so that the amount of interaction between the distorted fibrous layers and the aircraft structure is minimized.

2. A containment assembly as claimed in claim 1 in which the reinforcing plate is attached to the underside of a pylon from which the engine is mounted.

3. A containment assembly as claimed in claim 1 in which the plate is provided with rounded corners which prevent the distorted fibrous layers being damaged as they are deflected away from the aircraft structure by the plate.

4. A containment assembly as claimed in claim 1 in which the plate is metal.

5. A containment assembly as claimed in claim 1 in which the fibrous layers are manufactured from aramid fibres.

* * * * *